United States Patent [19]

Kobayashi et al.

[11] 3,722,382
[45] Mar. 27, 1973

[54] DEVICE FOR OPERATING A FLASH CIRCUIT IN AN AUTOMATIC FLASH CAMERA

[75] Inventors: Tatsuo Kobayashi, Kaizuka-shi; Maki Yamashita, Toyokawa-shi; Hideo Takeuchi, Gamagori-shi, all of Japan

[73] Assignee: Minolta Camera Kabushiki Kaisha, Minami-ku, Osaka, Japan

[22] Filed: Sept. 24, 1969

[21] Appl. No.: 860,749

[30] Foreign Application Priority Data

Sept. 30, 1968 Japan..................................43/84216

[52] U.S. Cl..................95/10 C, 95/11 R, 95/11.5 R, 95/64 R
[51] Int. Cl..............................................G03b 7/12
[58] Field of Search.........95/10 C, 53 R, 64 R, 64 A, 95/11 R, 11.5 R

[56] References Cited

UNITED STATES PATENTS

| 3,250,193 | 5/1966 | Horton | 95/10 C |
| 3,406,620 | 10/1968 | Hochreiter et al. | 95/10 C |
| 3,464,333 | 9/1969 | Koichi Aoki et al. | 95/10 C |
| 3,500,731 | 3/1970 | Blesson et al. | 95/10 C |

*Primary Examiner*—Samuel S. Matthews
*Assistant Examiner*—Joseph F. Peters, Jr.
*Attorney*—Watson, Cole, Grindle & Watson

[57] ABSTRACT

A device which actuates a flash circuit in a camera whenever the brightness of the scene being photographed is too low for the taking of pictures by ambient illumination. A switch is arranged on the member which arrests the needle pointer of a conventional galvanometer in an exposure meter circuit.

3 Claims, 3 Drawing Figures

A DEVICE FOR OPERATING A FLASH CIRCUIT IN AN AUTOMATIC FLASH CAMERA

BACKGROUND OF THE INVENTION

Devices for operating flash circuits by providing a pointer restraining plate for restraining the pointer of an exposure meter or a movable contact for operating a flashing circuit on a scanning member for scanning the position of pointer, and by establishing the discrepancy in the mobility of such a restraining plate or a scanning member in daylight photographing and flash photographing, when the brightness of the object is fit for flash photographing said movable contact is allowed to come into contact with a fixed contact to close a switch, and by pushing down a release rod a shutter is actuated and at the same time a synchro contact is closed to flash a flashing apparatus are known in the prior art.

However, in the construction described above a load accompanied by closing the switch is applied to the pointer restraining plate or the scanning member, so that if said load is small the contact pressure for the switch can not be obtained and may cause difficulty due to defective contact of the switch. In order to prevent such difficulty, the force of a spring for driving the pointer restraining plate or scanning member should be strong. However, the pointer restraining plate or scanning member is operated by the release operation by a release rod, so that said force acts upon the release rod, and such an external force applied to the release rod makes the operation of the release rod heavier and the reaction of the release rod uneven. This is a drawback in the prior art.

SUMMARY OF THE INVENTION

In order to obviate the drawbacks in the prior art mentioned above, the present invention is characterized in that an insulator is interposed between a movable contact and a fixed contact of a switch for a flash circuit fixed to a switch operation member operated by a release rod, and is arranged to interlock with displacement of a pointer restraining plate so as to retract from the space between said both contacts corresponding to the movement of said pointer restraining plate when the brightness of an object is fit for flash photography.

The primary object of the present invention is to strengthen the contact pressure in the switch for operating the flash-circuit which is adapted to open or close in accordance with the brightness of an object so as to prevent difficulties due to defective contact in an automatic flash camera.

The second object of the present invention is to facilitate the operation of a pointer restraining plate in a camera.

The third object of the present invention is to decrease the undesirable external force acting upon a release rod so as to smooth the operation in a camera.

DESCRIPTION OF THE PREFERRED EMBODIMENT

Figure 1:
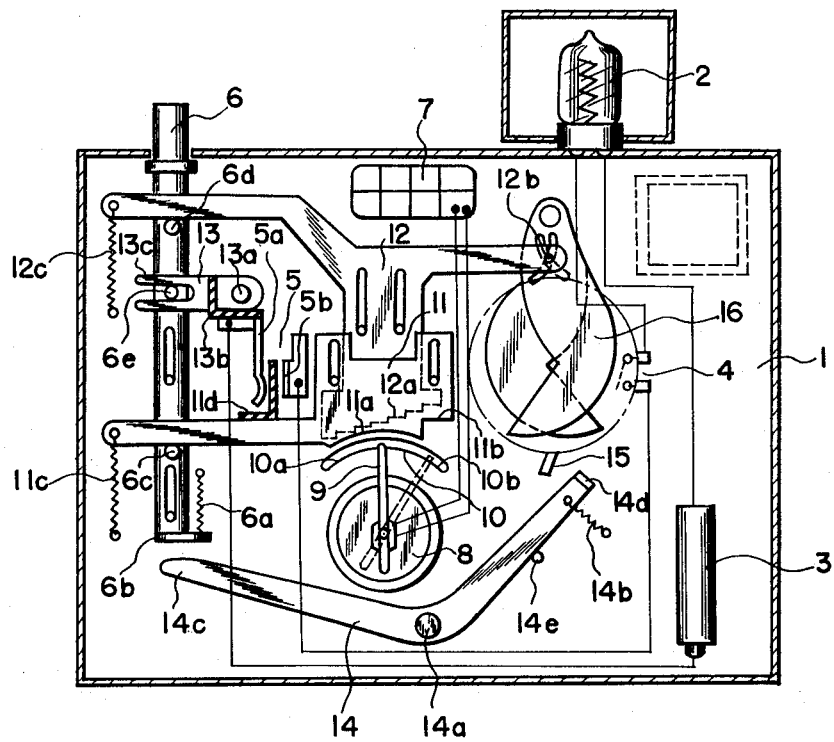
FIG. 1 is a front view showing a preferred embodiment prior to operation of a shutter release in accordance with the present invention.

With reference to the accompanying drawings a flash circuit is composed of flash lamp 2 of a flash apparatus provided fixedly or detachably in camera main body 1, battery 3 accomodated in said main body 1, synchro contact 4 provided on a shutter, and switch 5 for operating the flash circuit.

Release rod 6 is supported movably up and down relative to main body 1 by means of a guide slot and a pin provided on main body 1 and energized so as to hold the elevated position normally by means of return spring 6a as shown in FIG. 1. And, on the front of release rod 6 there is a pin 6c for operating the pointer restraining plate, pin 6d for operating the scanning plate, and pin 6e for operating the movable contact, and on the lower end thereof there is formed piece 6b for operating the shutter.

Pointer 9 of meter 8 is rotatable in a known manner by response of the meter to a photo-electric element 7 corresponding to the brightness of an object and is bent at its one end and supported so as to rotate along pointer receiver 10. Said pointer receiver 10 includes range 10b where the brightness of an object is weak and fit for flash photography and range 10a where the brightness is strong and fit for daylight photography.

By means of said pin provided on the main body, the guide slot thereof is guided, and pointer restraining plate 11 supported movably up and down relative to main body 1 is provided with pointer check edge 11a for matching with said daylight photographing range 10a and notched step 11b for matching with flash photographing range 10b, and has the tendency for descending by means of spring 11c so as to engage with said pin 6c for operating the pointer restraining plate. And, pointer restraining plate 11 is provided with insulator 11d fixed thereto for cooperating with the switch for operating the flash circuit described hereinafter.

Scanning plate 12 which is guided movably up and down relative to camera main body 1 in the same way as in said pointer restraining plate by means of a pin and a guide slot is provided with scanning edge 12a formed with steps and adjusting pin 12b for fitting into the operation hole provided on diaphragm blade 16, and pulled downward by means of operation spring 12c so as to engage with said pin 6d for operating the scanning plate provided on said release rod 6.

Movable contact supporter 13 is pivoted on spindle 13a rotatably relative to main body 1, and fork portion 13c thereof holds pin 6e for operating the movable contact provided on said release rod 6, and that movable contact 5a is supported thereon which is insulated from camera main body 1 by means of insulating piece 13b. Fixed contact 5b facing said movable contact 5a is fixed to camera body 1, and between said both contacts 5a and 5b insulator 11d fixed to said pointer restraining plate 11 and is interposed and in the elevated position of said pointer restraining plate, and when said pointer restraining plate descends and comes into contact with pointer 9 in daylight photographing range 10a and is stopped, insulator 11d is still interposed between said both contacts 5a and 5b, when pointer 9 is within flash photographing range 10b and pointer restraining plate 11 further descends by means of notched step 11b insulator lid retracts from the space between said both contacts 5a and 5b.

Connecting rod 14 is rotatably supported by a spindle 14a and is provided with the tendency for rotating clockwise by means of spring 14b; one arm, namely, driven arm 14c of said connecting rod 14 is arranged to face said piece 6b for operating the shutter of said release rod 6 and the other arm, namely, driving arm 14d is arranged to face shutter release 15 and restrained normally by graduating pin 14e.

In operation of the embodiment described above is as follows:

1. When the release rod is not pushed down, the disposition is taken as shown in FIG. 1, and release rod 6 is in the elevated position through strong return spring 6a, and pins 6c, 6d thereof allow pointer restraining plate 11 and scanning plate 12 respectively to retract from pointer receiver 10 and pointer 9 respectively against springs 11c, 12c, and movable contact 5a separates from fixed contact 5b and insulator 11d is interposed therebetween.

Figure 2:
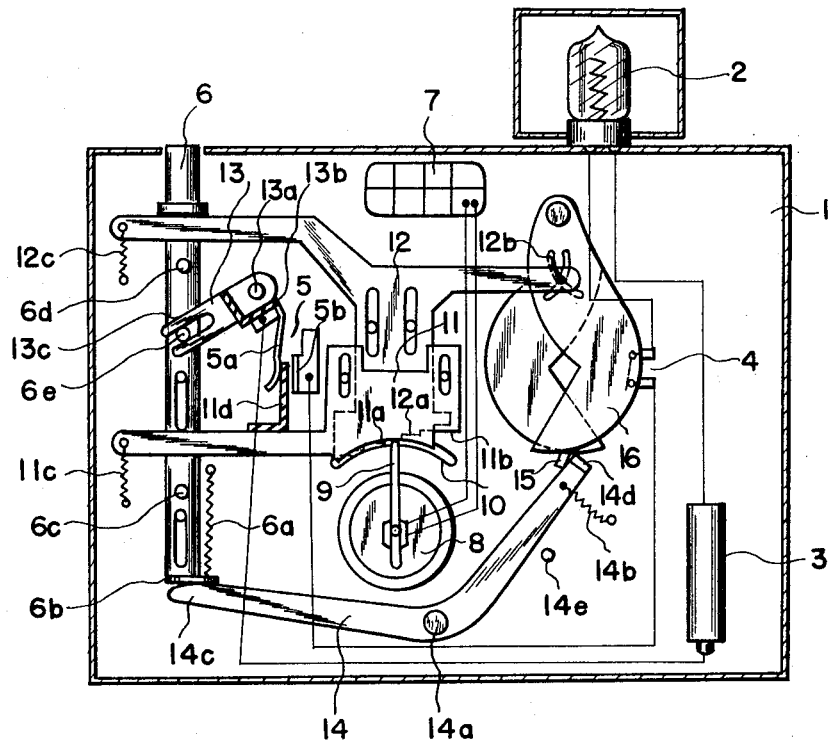
FIG. 2 is a front view of essential parts showing the situation wherein when the brightness of an object is fit for daylight photography the release operation is effected and a shutter is in operation in said embodiment.

2. When pointer 9 is in range 10a fit for daylight photographing in pointer receiver 10, by pressing down release rod 6, as shown in FIG. 2, the descent of said release rod 6, pointer restraining plate 11 and scanning plate 12 causes movable contact supporter 13 to rotate counter-clockwise.

That is, first, pointer check edge 11a of pointer restraining plate 11 comes into contact with pointer 9 to stay there checking it, and then scanning edge 12a of scanning plate 12 also comes into contact with pointer 9 to stop scanning plate 12 thereby fixing the opening size of diaphragm blade 16. Meanwhile, pin 6e for operating the movable contact provided on release rod 6 in further descending allows movable contact supporter 13 to rotate greatly so as to press movable contact 5a to come into contact strongly with fixed contact 5b, however, as described above, pointer 9 is in engagement with pointer check edge 11a and accordingly insulator 11d of pointer restraining plate 11 is still interposed between movable contact 5a and fixed contact 5b separating said both contacts from each other, therefore, switch 5 for operating the flash circuit is not closed but said piece 6b for operating the shutter comes into contact with connecting rod 14 so as to rotate it counter-clockwise to drive shutter release 15.

Consequently, in this case daylight photography is effected without emitting light from flash lamp 2.

Figure 3:
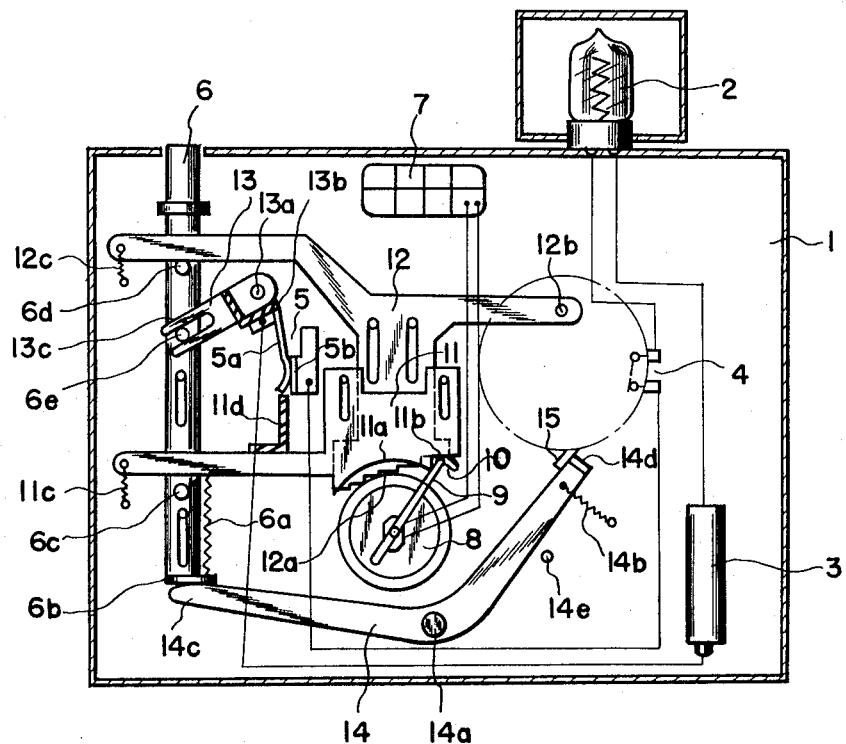
FIG. 3 is a front view of essential parts showing the situation wherein the brightness of an object is weak and the flash circuit is operated in said embodiment.

3. When pointer 9 is in range 10b fit for flash photography, by pressing down release rod 6, as shown in FIG. 3, pointer check edge 11a of pointer restraining plate 11 in descending continues to descend without coming into contact with the pointer and stops when notched step 11b comes into contact with pointer 9 or comes to the upper end of the guide slot., By increase of this descendent quantity of pointer restraining plate 11, movable contact 5a rotates counter-clockwise to come into contact with fixed contact 5b and at the same time insulator 11d retracts from this movable contact 5a, and accordingly both contacts comes into contact with each other with a strong force and securely so as to close the operation switch for the flash circuit.

Meanwhile, scanning plate 12 continues to descend until the upper-most end of step-shaped scanning edge 12a thereof comes into contact with pointer 9 and opens diaphragm blade 16 fully and then said piece 6b for operating the shutter comes into contact with connecting rod 11 to rotate it counter-clockwise and thereby driving arm 14 thereof drives shutter release 15 to open the shutter, and in synchronization with this operation synchronizing contact 4 is closed to ignite flash lamp 2.

In the cases described in above (2) and (3), upon discontinuing to press release rod 6 every part concerned returns to the situation described in above (1) by means of return spring 6a.

We claim:

1. In an automatic flash camera provided with a release rod, a meter pointer in an exposure meter, and a pointer receiver, a pointer restraining plate having an insulator, and a switch for operating a flash circuit having a power source, a flash lamp, and a synchro contact, a device for operating the flash circuit characterized in that the pointer restraining plate, which by operating said release rod restrains said pointer to said pointer receiver following operation of said release rod, is provided with a check edge for checking the pointer position where the brightness of an object is fit for daylight photographing and a notched step for engaging with the pointer in the pointer position where the brightness of an object is fit for flash photographing; and said insulator is interposed between contacts of said switch for operating the flash circuit which is closed as with said release rod operated when said check edge of the pointer restraining plate checks the pointer, and retracted from the space between said contacts of said switch for operating the flashing circuit to permit said switch to close only when the pointer is in alignment with said notched step of the pointer restraining plate.

2. A device for operating a flash circuit in an automatic flash camera set forth in claim 1, wherein there is provided a scanning plate which on operating the release rod follows this rod and which is provided with a scanning edge for scanning the pointer position while the pointer is restrained in position against the pointer receiver by the pointer restraining plate to adjust an exposure adjusting member.

3. A device for operating a flash circuit in an automatic flash camera set forth in claim 1, wherein the switch for operating the flash circuit is composed of a movable contact supported on a movable contact supporter pivoted on the camera main body and is insulated therefrom and a fixed contact fixed to said camera main body, said movable contact supporter being provided with a fork portion and said fork portion being engaged with a pin on the release rod for operating the movable contact so as to allow said movable contact to come into contact with said fixed contact rotating in response to operation of said release rod.

* * * * *